United States Patent [19]
Chellis

[11] 3,945,684
[45] Mar. 23, 1976

[54] AB FREIGHT VALVE TEST RACK

[75] Inventor: Willard B. Chellis, Russell, Ky.

[73] Assignee: The Chesapeake and Ohio Railway Company, Cleveland, Ohio

[22] Filed: Mar. 27, 1975

[21] Appl. No.: 562,672

[52] U.S. Cl. .................................... 303/1; 73/39
[51] Int. Cl.² ................... B60T 17/00; G01M 3/00
[58] Field of Search ............. 303/1, 86; 73/121, 39; 181/40, 49, 56, 57; 248/2

[56] References Cited
UNITED STATES PATENTS

| | | | |
|---|---|---|---|
| 2,509,816 | 5/1950 | Elson | 73/39 |
| 3,304,420 | 2/1967 | Bowman | 303/1 X |
| 3,675,732 | 7/1972 | Rosen et al. | 181/40 X |
| 3,872,711 | 3/1975 | Atkinson et al. | 73/39 |

OTHER PUBLICATIONS

Code of Tests "AB" Freight Equipment Valves, Westinghouse Air Brake Comp., No. 5039-19, Aug. 1935, p. 4, 16.

*Primary Examiner*—Trygve Blix
*Assistant Examiner*—Douglas C. Butler
*Attorney, Agent, or Firm*—Cushman, Darby & Cushman

[57] ABSTRACT

A modified AB test rack for testing freight car brake equipment valves in which excessive noise produced during standard tests by air exiting the quick action exhaust port of the emergency portion and the duplex release valve of the service portion is eliminated by connecting, by a quick action valve operating by an air cylinder, the respective port and release valve, to a manifold which is in turn connected to a muffler having an inlet at one end, a number of baffles and apertured plates forming a tortuous path to an outlet formed by a number of holes through the opposite end and adjacent sides.

4 Claims, 7 Drawing Figures

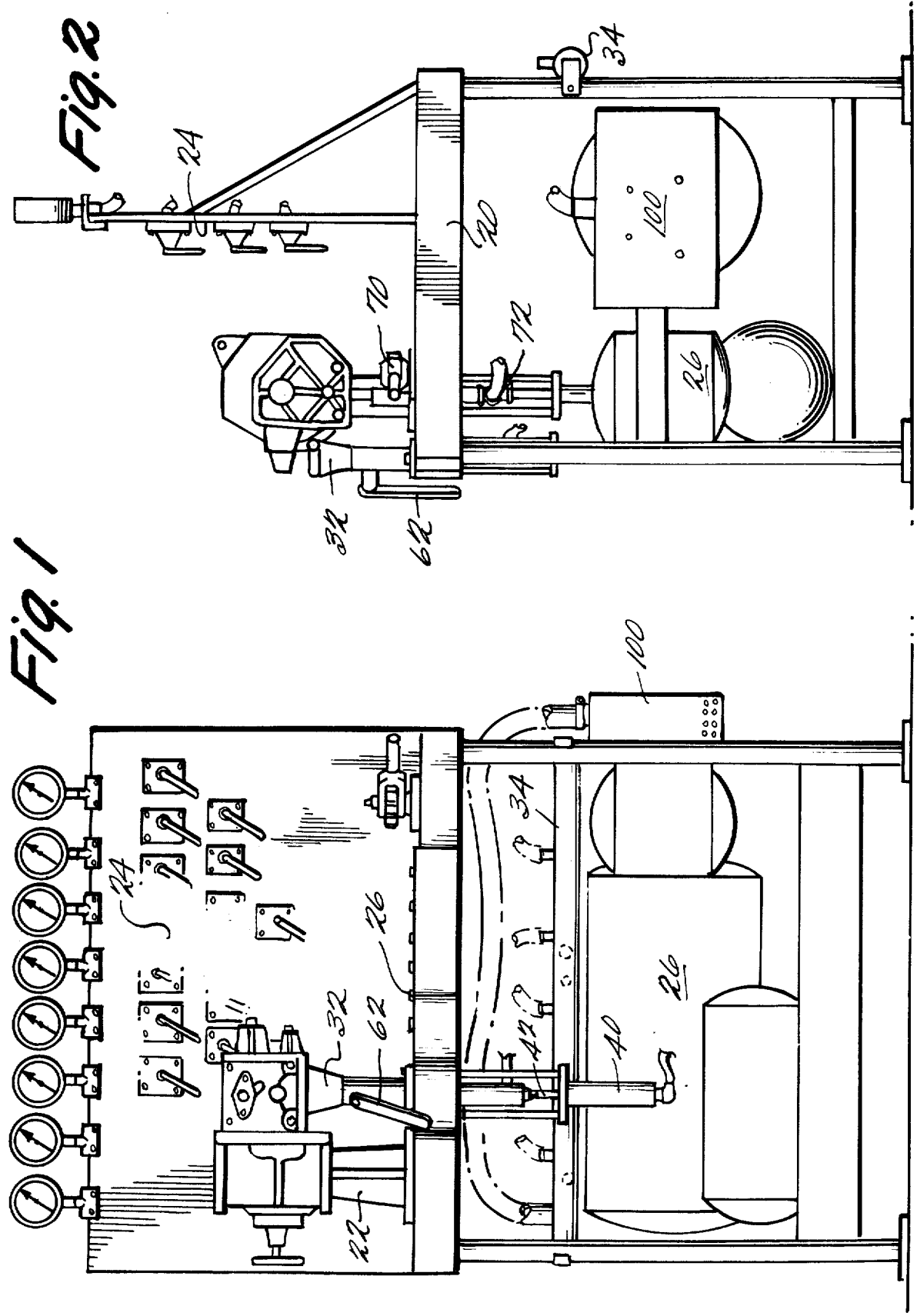

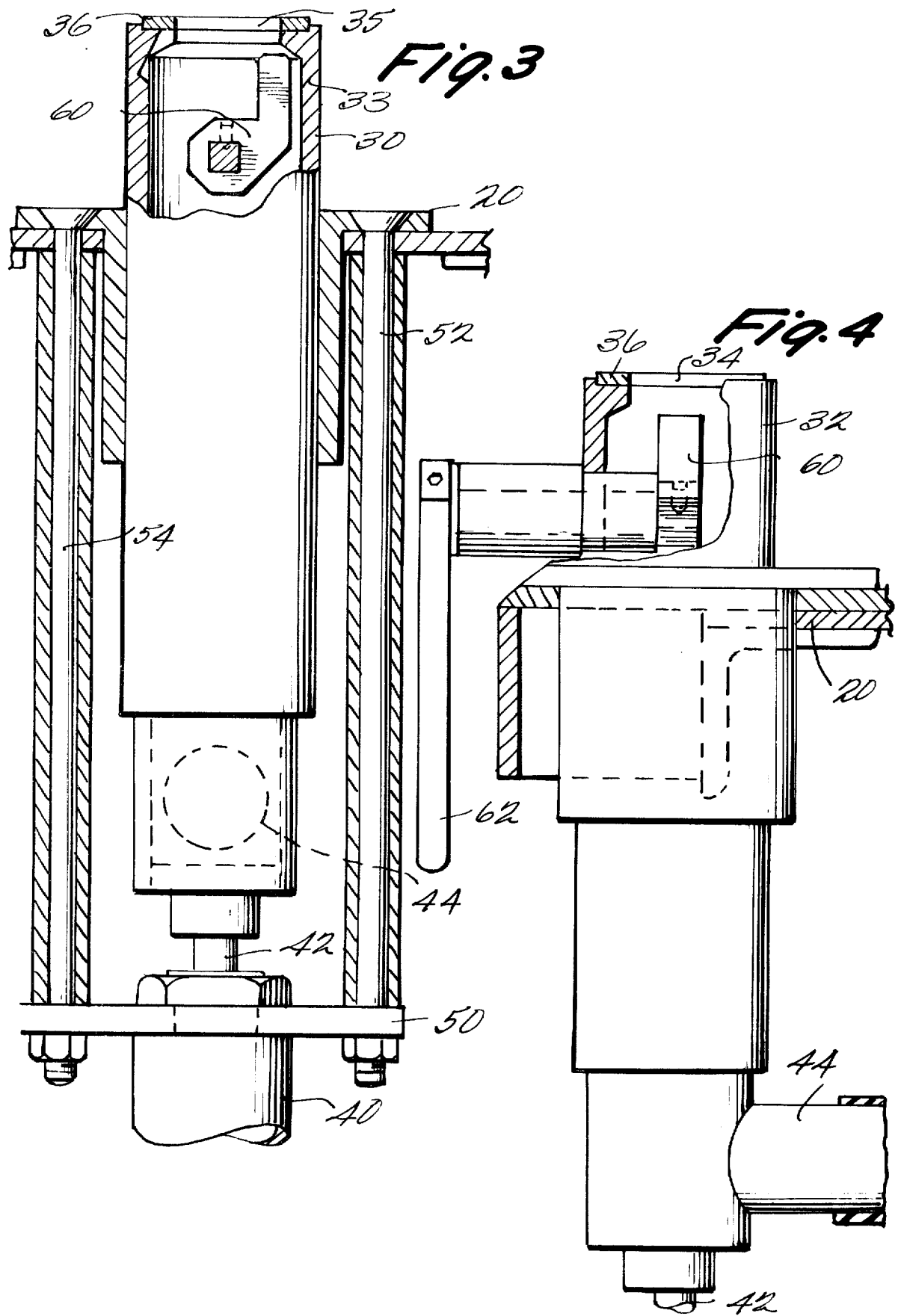

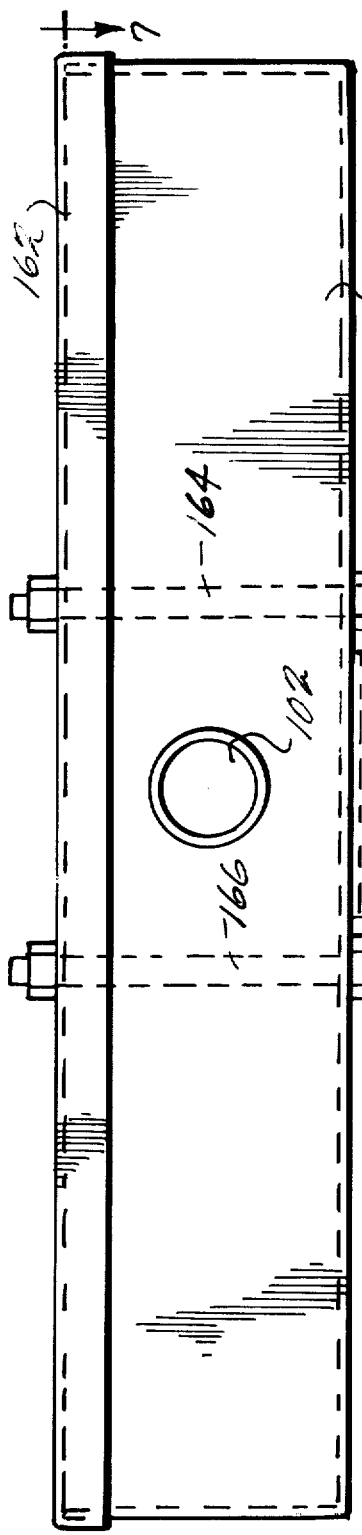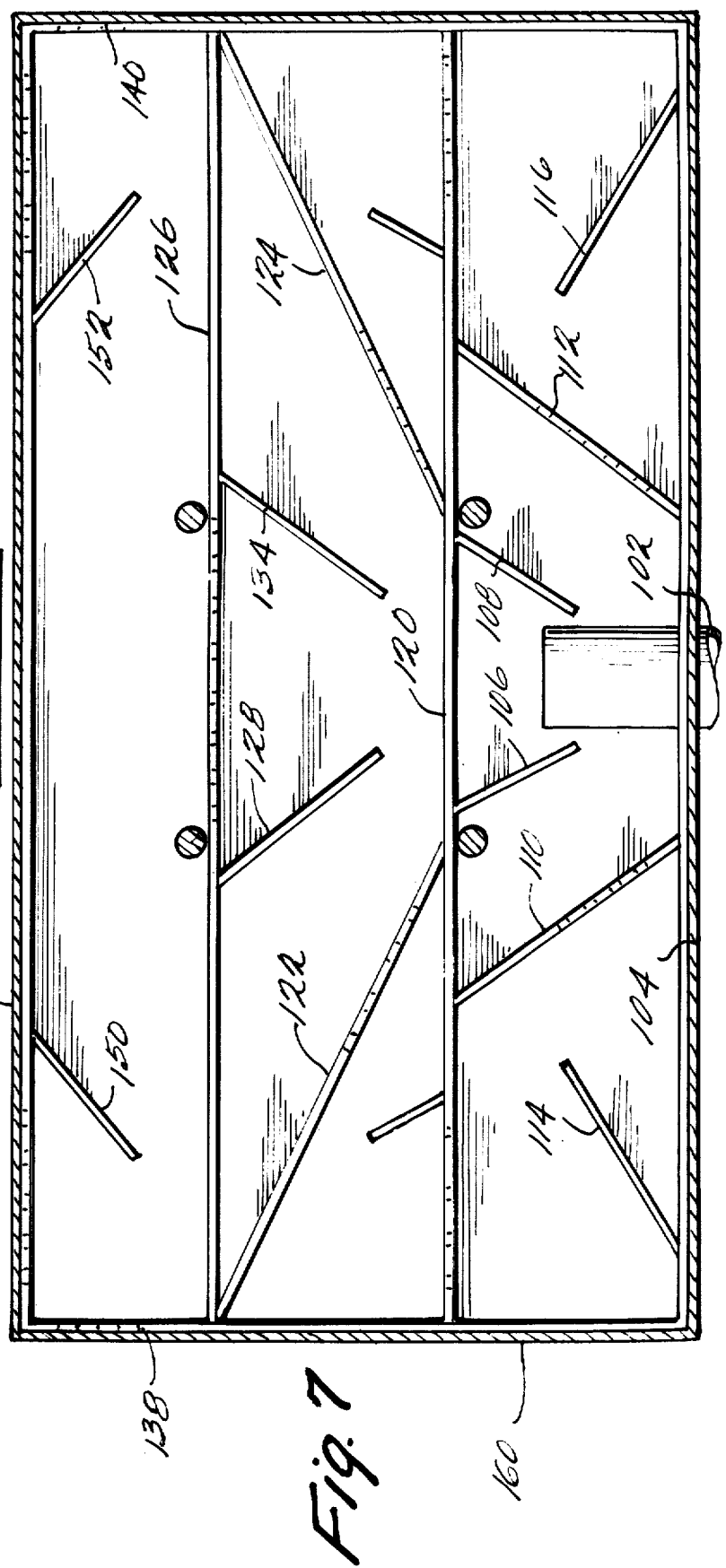

AB FREIGHT VALVE TEST RACK

The invention relates to an improvement to the test rack for testing conventional AB, ABD and similar freight equipment valves and the like.

Freight equipment valves, which are usually referred to "AB" and "ABD" valves, are tested periodically on a test rack which has been utilized for many years. Standard tests are carried out on this test rack which includes a source of pressurized air and a coupling arrangement for connecting that source to the various ports and connections of the emergency and service portions of each valve which are tested separately. AB valves and the test procedures are described in detail in Instruction Pamplet 5039-19 entitled Code of Tests "AB" Freight Equipment Valves. This instruction pamphlet was published in January 1956 and describes the requisite standard tests in detail.

In some of these tests and particularly during Test No. 1 of the emergency portion the air escaping from the quick action exhaust port creates noise levels that fall within the range of normal conversation making the area around the test rack unpleasant and making communications difficult. When the duplex release valve of the service portion is operated during standard Test No. 5 the highest noise level of all is produced.

In the past, mufflers had been used on test racks to reduce the noise of air escaping from rotary A valves and cocks 22, 12 and 7. While these mufflers reduced the noise level to some degree they did not deal with the most objectional noise levels which occur by exhaust of gases through the duplex valve of the service portion and the emergency exhaust port of the emergency portion.

According to this invention, an improved test rack is described wherein quick connectors are provided, each including a valve portion which can be coupled by movement of an attached air cylinder to connect the quick action exhaust port to a manifold when the emergency portion is mounted for testing and a second connector to couple the duplex valve to the same manifold when the service portion is mounted for testing. Each of these valve portions include an interior path which guides the air exhausting from the respective valves to the manifold. The manifold is connected to an inlet of a muffler having a rectangular cross section with the inlet disposed roughly in the center of one end. The muffler is divided by a number of apertured panels into separate chambers each including a number of baffles which guide the air flow in a tortuous path between the inlet and an outlet formed by a number of apertures in the end of the muffler opposite the inlet and in the adjacent sides thereof.

Many other objects and purposes of the invention will be clear from the following detailed description of the drawings.

BRIEF DESCRIPTION OF THE DRAWINGS

FIG. 1 shows a front view of an AB test rack modified according to this invention.

FIG. 2 shows a side view of the test rack of FIG. 1.

FIG. 3 shows a front and partially cut-away sectional view of the quick action valves for connecting the duplex valve of the service portion to the manifold.

FIG. 4 shows a side view of the connector of FIG. 3.

FIG. 6 shows a side view of the unique muffler of this invention.

FIG. 7 shows a cut-away view of the muffler of FIG. 6 along the lines 7—7.

DETAILED DESCRIPTION OF THE DRAWINGS

Figure 5:
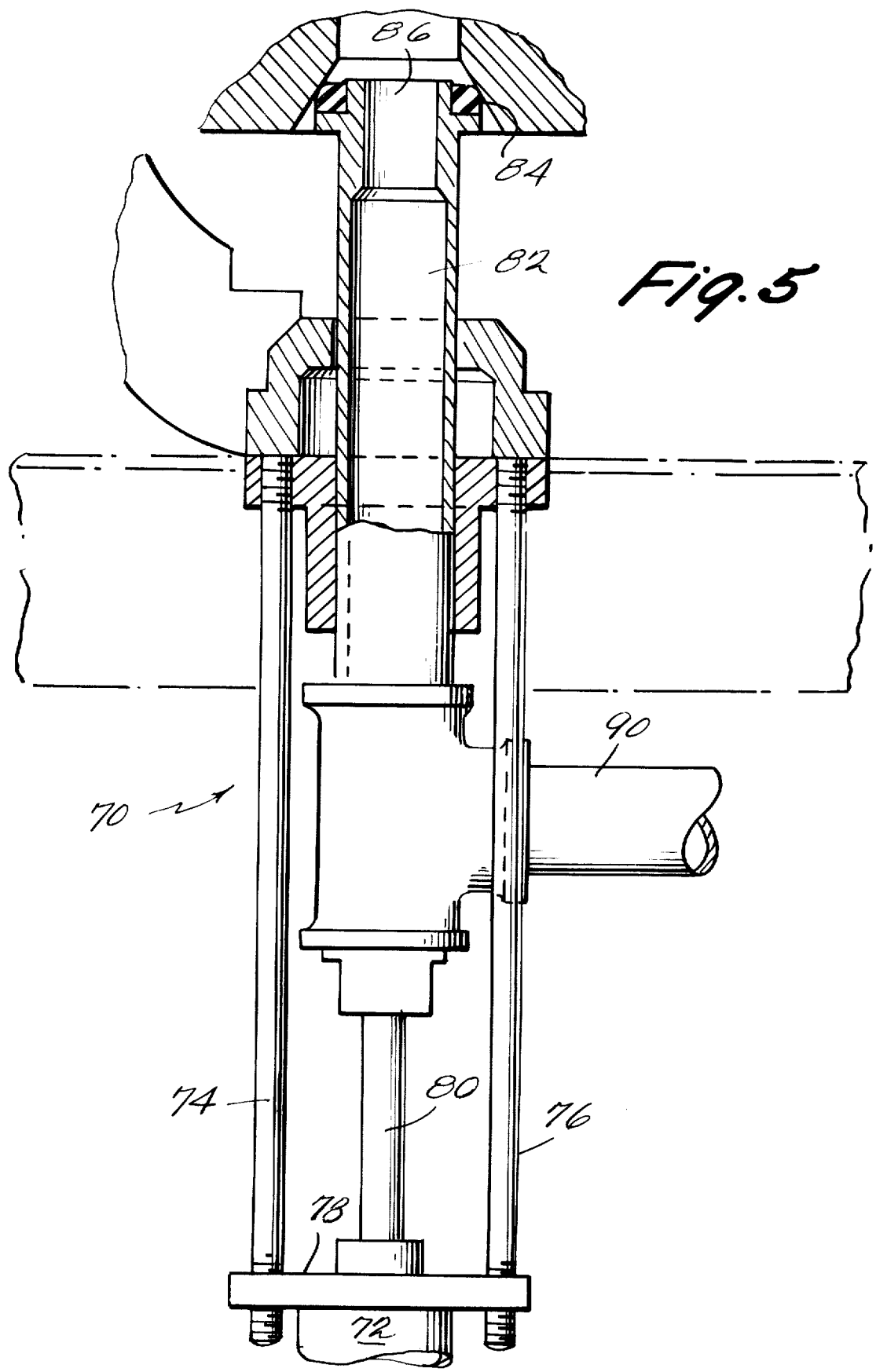
FIG. 5 shows a front partially sectioned view of the quick connector for connecting the emergency exhaust port of the emergency portion to the manifold.

Reference is now made to FIGS. 1 and 2 which illustrate an AB test rack in which a service portion or an emergency portion can be mounted on the appropriate test plate as described in the above instruction pamphlet and mounted above the surface of table 20 on conventional bracket 22. The service or emergency portion thus mounted is then coupled to a number of cocks indicated as 24 to carry out standard test procedures. Air pressure for carrying out these tests is supplied by a suitable source indicated generally as 26. In the arrangement of FIGS. 1 and 2, a service portion is shown mounted in place.

Referring to FIGS. 3 and 4 as well as FIGS. 1 and 2, the quick connector 30 functions to connect the duplex service valve indicated as 32 to a manifold 34 mounted below table 20 by a flexible hose. Quick action connector 30 includes a valve member 33 with an inlet 35 and a gasket 36 disposed about the inlet. Valve member 33 is moveable vertically through a suitable hole drilled in surface 20 as described below by means of a conventional air cylinder 40 having a piston 42 which connects to valve portion 33. A suitable flexible hose is attached to the outlet 44 of the valve member 33. Plate 50 together with bolts 52 and 54 attach air cylinder 40 firmly to the table surface 20.

Pivotable actuating member 60 is mounted within the passage between the inlet 34 and outlet 44 for manual movement by handle 62 to trip the duplex valve as required during the test procedures. Operation of air cylinder 40 by means of a conventional control (not shown) which may be mounted any where desired in the AB test rack causes movement of the piston 42 and the attached valve member 33 until the valve member 33 is in the firm connection with the duplex valve.

Reference is mow made to FIG. 5 which illustrates a similar quick action valve which is utilized for connecting the emergency exhaust port to manifold 34. Quick action valve 70 similarly includes an air cylinder 72 which is mounted below the table surface 20 via bolts 74 and 76 and plate 78. Piston 80 shifts the valve member 82 vertically between a withdrawn position and a position in which valve member 82 is coupled firmly to the exhaust port. Gasket 84 surrounds the inlet 86 of the valve member 82. Outlet 90 of valve member 82 is connected to manifold 34.

Reference is now made to FIGS. 6 and 7 which illustrate the unique muffler 100 to which the manifold 34 is connected by a suitable flexible hose or the like. The muffler is a high capacity, low back pressure device that will reduce measured noise levels from 112 dbA to 74 dbA. Air from the manifold 34 which includes air from the quick action exhaust port and from the duplex valve enters the muffler 100 to an inlet 102 roughly in the center of one end 104. The air entering the muffler is split into two paths by baffles 106 and 108 and passes respectively through apertured plates 110 and 112. Air flow is guided by further baffles 114 and 116 through the apertures in panel 120 which extends roughly parallel to end 104. After passage through the apertures in panel 120 the air passes through apertured plates 122 and 124 respectively and is guided through the apertures in the panel 126 by baffles 128 and 130. After movement through panel 126 the air stream is again split and passes out of the muffler through a plurality of apertures in opposite sides of end 136 and in the adjacent parts of the sides 138 and 140. Baffles 150 and 152 guideflow of the air within the chamber formed between panel 126 and end 136. The muffler is preferably formed in two parts 160 and 162 as can be seen in FIG. 6 with those parts held together by bolts 164 and 166.

The actual conversion of a conventional test plate can be carried out simply and quickly. The first step in making the conversion is to modify the AB-2 test plate (not shown). The plunger and its operating diaphragm used to hold cock 21 in position are removed and replaced with the structure in FIG. 5.

It has been found that AB-2 test plates vary in dimensions requiring rather detailed re-machining. The connector 70 is centered on the quick action exhaust port of the emergency valve. An emergency portion, with gasket, should be bolted to the test plate. A vent protector plug, with its center located and center punched, should be screwed into the exhaust port. Next the emergency ball check cover is removed and the assembly bolted to the table of a vertical milling machine or drill press, with the spindle centered over the center of the vent plug. The ¾ inch opening in the diaphragm housing should then be bored to 1⅜ inch diameter. To insure that the bore of the quick action connector 70 will be perpendicular to the base of the diaphragm housing a light cut should be made on the base of the housing. The four tapped holes in the housing must be reamed to 7/16 inch. Because these holes will no doubt be in line with the existing ¾ inch bore it is necessary that they be brought into central relationship with the new 1⅜ bore by making a drill bushing plate with a 1⅜ inch + .010 inch center hole and 7/16 inch dia drilled holes to match the 4 7/16 inch tapped holes in detail 3. The bushing plate should be centered (using a 1⅜ dia. pin) to the new 1⅜ inch dia. bore, with holes aligned as closely as possible with existing tapped holes. Bushing plate should then be clamped to the diaphragm housing and holes reamed to 7/16 inch.

The balance of the connections to the manifold are preferably made by installing pipe nipples to various valves and connecting with PVC tubing.

Seven connections to the muffler are required for the service portion; these are cocks 12, 15 and 7, Rotary Valve A, the Duplex Valve Exhaust Connector 30, to the four-way valve operating connector 30, and muffler 100.

Connector 30 is mounted so that its axis is perpendicular to, and concentric with, the bottom of the release valve body. It was found that test rack table tops have been warped to the extent that it is desirable to provide a common base for the valve bracket and the mounting for the connector.

The air way used previously for pressure to the diaphragm must be drilled out, tapped ⅛ inch NPT and plugged. It is suggested that this be done prior to facing the underside of the housing so that plug can be faced off so as to not interfere when installed.

The top of the diaphragm housing is machined as shown to provide sufficient clearance for modified cock 21.

With the modified test plate re-installed on the rack, the center of the 1⅜ inch opening on the table top is located. The plate is removed and an opening in table top formed.

The service test plate is now removed and the above modifications assembled. Connector 32 should then be assembled to the 1 inch pipe tee and air cylinder 40 adjusting the assembly so that when the cylinder 40 is down, there is 1/16 inch clearance between the top of the diaphragm housing and flange collar of the connector 32. A ¼ inch four-way operating valve for cylinder 40 is preferably installed on the rack. A convenient location has been found to be in the lower right corner of the test rack back plate. It is convenient for the rack operator if the four-way valve is piped so that an upward motion of the valve handle will raise the connector 40 and conversly a downward motion will lower connector 40. ¼ inch plastic tubing is sufficient for air supply to the four-way valve and between the valve and cylinder 40.

Cock 21 is modified so that it will work with the quick connector and be centered with it. The use of cock 21 is then the same as in the standard tests. A ⅜ inch pipe nipple choke drilled with a No. 30 drill is made to connect cock 21 with the manifold.

Many changes and modifications of the above described invention can, of course, be carried out without departing from the scope thereof. Accordingly, that scope is intended to be limited only by the scope of the appended claims.

What is claimed is:

1. In an AB test rack having means for mounting an AB service portion with a duplex release valve and an AB emergency portion with a quick action exhaust port, a source of air under pressure, and valve means for connecting other ports of said portions to said source and to the atmosphere to carry out standard tests, the improvement comprising a manifold, a first quick connector for coupling, when actuated, said duplex valve of a mounted service portion to said manifold, said first connector including an air cylinder, means for connecting said air cylinder to said source, a connecting valve mounted for movement with said cylinder into a position engaging said duplex valve and having an interior path for conducting air exiting from said duplex valve to an outlet, and means for connecting said outlet to said manifold, a second quick connector for coupling, when activated, said quick action exhaust port of a mounted emergency portion to said manifold, said second connector including a second air cylinder, means for connecting said second cylinder to said source, a second connecting valve mounted for movement with said second cylinder into a position engaging said quick action exhaust port and having an interior path for conducting air exiting from said quick action exhaust port to an outlet, and means for connecting said outlet of said second connecting valve to said manifold, a muffler having an inlet and outlet and a plurality of aperture baffle plates therein defining a path between said inlet and outlet, and means for connecting said manifold to the inlet of said muffler.

2. In a rack as in claim 1, wherein said rack has a table surface and means for mounting said portions above said surface and the further improvement comprising means for mounting said first and second quick connectors for vertical movement through said surface.

3. In a rack as in claim 2 the further improvement wherein said muffler has a rectangular cross section with a plurality of separating panels extending roughly parallel to the ends thereof to form muffling chambers and having apertures therethrough to permit air to pass from chamber to the adjacent chambers and a plurality of baffle plates in each said chamber for guiding air flow in a tortuous path.

4. In a rack as in claim 3, wherein said inlet to said muffler is roughly in the center of one of said ends, said baffles divide the incoming air into two streams which move on opposite sides of said inlet through a first of said panels having apertures on either side of said inlet and then through a second of said panels having apertures in the center thereof and wherein said outlet comprises a plurality of apertures through the end and sides of the muffler opposite said inlet.

* * * * *